United States Patent
Wang et al.

(10) Patent No.: US 9,526,013 B2
(45) Date of Patent: Dec. 20, 2016

(54) METHOD AND APPARATUS FOR PROCESSING NETWORK CONFIGURATION, AND RADIO NETWORK CONTROLLER

(71) Applicant: HUAWEI TECHNOLOGIES CO., LTD., Shenzhen, Guangdong (CN)

(72) Inventors: Yiyun Wang, Shanghai (CN); Longlong Gao, Shanghai (CN); Yao Yao, Shanghai (CN); Bin Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 14/076,443

(22) Filed: Nov. 11, 2013

(65) Prior Publication Data

US 2014/0064146 A1 Mar. 6, 2014

Related U.S. Application Data

(63) Continuation of application No. PCT/CN2011/073949, filed on May 11, 2011.

(51) Int. Cl.
*H04W 16/24* (2009.01)
*H04W 36/00* (2009.01)
(Continued)

(52) U.S. Cl.
CPC ......... *H04W 16/24* (2013.01); *H04W 36/0083* (2013.01); *H04L 41/08* (2013.01); *H04W 36/0094* (2013.01); *H04W 36/14* (2013.01)

(58) Field of Classification Search
CPC .......................... H04W 16/24; H04W 36/0083
(Continued)

(56) References Cited

U.S. PATENT DOCUMENTS

2005/0208942 A1* 9/2005 Pekonen ............... H04W 36/30
455/436
2007/0287459 A1* 12/2007 Diachina et al. ............. 455/436
(Continued)

FOREIGN PATENT DOCUMENTS

CN 101272602 9/2008
CN 101448239 6/2009
(Continued)

OTHER PUBLICATIONS

Extended and Supplementary European Search Report issued on Dec. 8, 2014 in corresponding European Patent Application No. 11765090.3.
(Continued)

*Primary Examiner* — Stephen J Clawson
(74) *Attorney, Agent, or Firm* — Staas & Halsey LLP

(57) ABSTRACT

The present invention provides a method and an apparatus for processing network configuration, and a radio network controller. The method includes: establishing a neighboring cell relationship between a macro cell and a generic access network cell, where the neighboring cell relationship is a neighboring cell mapping relationship between a radio network controller of the macro cell and a generic access network controller of the generic access network cell, and more than two generic access network cells share one generic access network controller; and when a handover of a user equipment from the macro cell to the generic access network cell occurs, sending a measurement control message to the user equipment according to the neighboring cell relationship between the macro cell and the generic access network cell.

12 Claims, 2 Drawing Sheets

Establish a neighboring cell relationship between a macro cell and a generic access network cell, where the neighboring cell relationship is a neighboring cell mapping relationship between an RNC of the macro cell and a GANC of the generic access network cell, and more than two generic access network cells share one GANC — 101

When a handover of a user equipment from the macro cell to the generic access network cell occurs, send a measurement control message to the user equipment according to the neighboring cell relationship between the macro cell and the generic access network cell — 102

(51) Int. Cl.
*H04L 12/24* (2006.01)
*H04W 36/14* (2009.01)

(58) Field of Classification Search
USPC .......................................................... 370/254
See application file for complete search history.

(56) References Cited

U.S. PATENT DOCUMENTS

| | | | |
|---|---|---|---|
| 2008/0051086 A2* | 2/2008 | Etemad et al. | 455/436 |
| 2008/0090571 A1* | 4/2008 | Kwong | 455/436 |
| 2009/0061877 A1* | 3/2009 | Gallagher et al. | 455/436 |
| 2009/0265543 A1* | 10/2009 | Khetawat et al. | 713/151 |
| 2009/0280813 A1 | 11/2009 | Bavois et al. | |
| 2009/0296653 A1* | 12/2009 | Lee et al. | 370/331 |
| 2011/0019639 A1* | 1/2011 | Karaoguz et al. | 370/331 |
| 2011/0090864 A1* | 4/2011 | Nylander et al. | 370/331 |
| 2011/0300866 A1* | 12/2011 | Ali et al. | 455/436 |
| 2012/0164979 A1* | 6/2012 | Bachmann et al. | 455/411 |

FOREIGN PATENT DOCUMENTS

| | | |
|---|---|---|
| CN | 101543107 | 9/2009 |
| WO | WO2009059622 | 5/2009 |

OTHER PUBLICATIONS

Jarmo Harno et al., "Service Offerings for Fixed-Mobile Convergence Scenario: An Integrated Operator Case", International Journal of Business Data Communications and Networking, vol. 5, No. 3, Jul.-Sep. 2009, 17 Pages.

International Search Report and Written Opinion, dated Feb. 2, 2012, in corresponding International Application No. PCT/CN2011/073949 (11 pp.)

3rd *Generation Partnership Project; Technical Specification Group Core Network and Terminals; Mobile radio interface Layer 3 specification; Core network protocols; Stage 3* (Release 10), 3GPP TS 24.008 V10.2.0 (Mar. 2011), pp. 1-634.

3rd *Generation Partnership Project; Technical Specification Group Radio Access Network; UE Radio Access capabilities* (Release 10), 3GPP TS 25.306 V10.2.0 (Mar. 2011), pp. 1-62.

3rd *Generation Partnership Project; Technical Specification Group Radio Access Network; Radio Resource Control (RRC); Protocol specification* (Release 10), 3GPP TS 25.331 V10.3.1 (Apr. 2011), pp. 1-1863.

3rd *Generation Partnership Project; Technical Specification Group GSM/EDGE Radio Access Network; Packet-switched handover for GERAN A/Gb mode; Stage 2* (Release 9), 3GPP TS 43.129 V10.0.0 (Mar. 2011), pp. 1-95.

3rd *Generation Partnership Project; Technical Specification Group GSM/EDGE Radio Access Network; Generic Access Network (GAN); Stage 2* (Release 10), 3GPP TS 43.318 V10.1.0 (Mar. 2011), pp. 1-252.

3rd *Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol* (Release 10), 3GPP TS 44.060 V10.4.0 (Mar. 2011), pp. 1-622.

3rd *Generation Partnership Project; Technical Specification Group GSM/EDGE Radio Access Network; Generic Access Network (GAN); Mobile GAN interface layer 3 specification* (Release 11), 3GPP TS 44.318 V11.0.0 (Mar. 2011), pp. 1-252.

* cited by examiner

METHOD AND APPARATUS FOR PROCESSING NETWORK CONFIGURATION, AND RADIO NETWORK CONTROLLER

CROSS-REFERENCE TO RELATED APPLICATIONS

This application is a continuation of International Application No. PCT/CN2011/073949, filed on May 11, 2011, which is hereby incorporated by reference in its entirety.

TECHNICAL FIELD

Embodiments of the present invention relate to the field of communications technologies, and in particular, to a method and an apparatus for processing network configuration, and a radio network controller.

BACKGROUND

The unlicensed mobile access (Unlicensed Mobile Access, UMA for short) technology is jointly initiated by multiple industry leading operators and providers. An objective of the unlicensed mobile access technology is to develop and release a group of standards to extend mobile voice and data in GSM/GPRS to be used in frequency spectrum technologies which do not require a license (such as Bluetooth and a wireless local area network), so as to implement seamless transfer of the mobile voice and data from a mobile phone network to a wireless local area network (WLAN/WiFi). The UMTS/GAN interworking based on a generic access network (Generic Access Network, GAN for short) is standardized in 3GPP Re16 and further developed in Re17 and Re18.

FIG. 1 is a GAN/EGAN architecture diagram in the prior art. Referring to FIG. 1, a mobile station (mobile station, MS for short) establishes an IP connection with a generic access network controller (Generic Access Network Controller, GANC for short)/EGANC through a wireless local area network (Wireless Local Area Networks, WLAN for short) or Bluetooth (bluetooth) which is used as an access means, where one of an A/Gb interface, an Iu-cs interface, and an Iu-ps interface or a combination thereof may be used between the GANC/EGANC and a core network, and a connection is established between the GANC/EGANC and an MSC, an SGSN or a 3A proxy/server (AAA Proxy/server), so as to support the coverage of a GSM/GPRS/UMTS access network. Meanwhile, the mobile station may also support one of a GAN A/Gb mode and a GAN Iu mode or a combination thereof. To support the GAN mode, the mobile station needs two transceivers to measure a GERAN/UTRAN cell and a GAN cell respectively. From the perspective of a core network, the GANC/EGANC is an ordinary base station subsystem (Base Station Subsystem, BSS for short) or a radio network controller (Radio Network Controller, RNC for short). The architecture may not influence the flow of the core network, where the GANC/EGANC is a unified controller of multiple GAN/EGAN cells and one GANC/EGANC is corresponding to multiple GAN/EGAN cells.

In existing intra-frequency neighboring cell or inter-system neighboring cell configuration, a mapping relationship is established with a current cell based on a unit of a cell; for an access network element of a GAN network, the access network element may be considered as a logical UMTS network element in Iu mode and may be considered as a logical GSM network element in A/Gb mode, and the number of the access network elements of the GAN is much greater than the number of macro cells. For a macro cell, it is required to allocate a large number of logical UMTS neighboring cells or GSM neighboring cells respectively, which makes the configuration of the UMTS network and the GAN neighboring network rather complex and increases the workload of network management and configuration.

SUMMARY

Embodiments of the present invention provide a method and an apparatus for processing network configuration, and a radio network controller, so as to effectively reduce the complexity of performing neighboring network configuration between a macro network and a GAN network.

In one aspect of the present invention, a method for processing network configuration is provided, which includes: establishing a neighboring cell relationship between a macro cell and a generic access network cell, where the neighboring cell relationship is a neighboring cell mapping relationship between a radio network controller of the macro cell and a generic access network controller of the generic access network cell, and more than two generic access network cells share one generic access network controller; and when a handover of a user equipment from the macro cell to the generic access network cell occurs, sending a measurement control message to the user equipment according to the neighboring cell relationship between the macro cell and the generic access network cell.

In another aspect of the present invention, an apparatus for processing network configuration is further provided, which includes a neighboring cell establishment module and a handover processing module.

The neighboring cell establishment module is configured to establish a neighboring cell relationship between a macro cell and a generic access network cell, where the neighboring cell relationship is a neighboring cell mapping relationship between a radio network controller of the macro cell and a generic access network controller of the generic access network cell, and more than two generic access network cells share one generic access network controller.

The handover processing module is configured to: when a handover of a user equipment from the macro cell to the generic access network cell occurs, send a measurement control message to the user equipment according to the neighboring cell relationship between the macro cell and the generic access network cell.

In another aspect of the present invention, a radio network controller is further provided, which includes the apparatus for processing network configuration.

In the method and the apparatus for processing network configuration, and the radio network controller that are provided in the embodiments of the present invention, when a neighboring cell relationship between a macro cell and a generic access network cell is established, the neighboring cell relationship with an RNC of the macro cell is established based on a unit of a GANC; compared with the establishment of a neighboring cell relationship with the RNC of the macro cell that is performed based on a unit of a generic access network cell, the number of the mapping relationships is decreased, the complexity of performing neighboring network configuration between a GAN network and a network such as a UMTS or LTE network may be effectively reduced, and the workload of network management and configuration is lowered.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
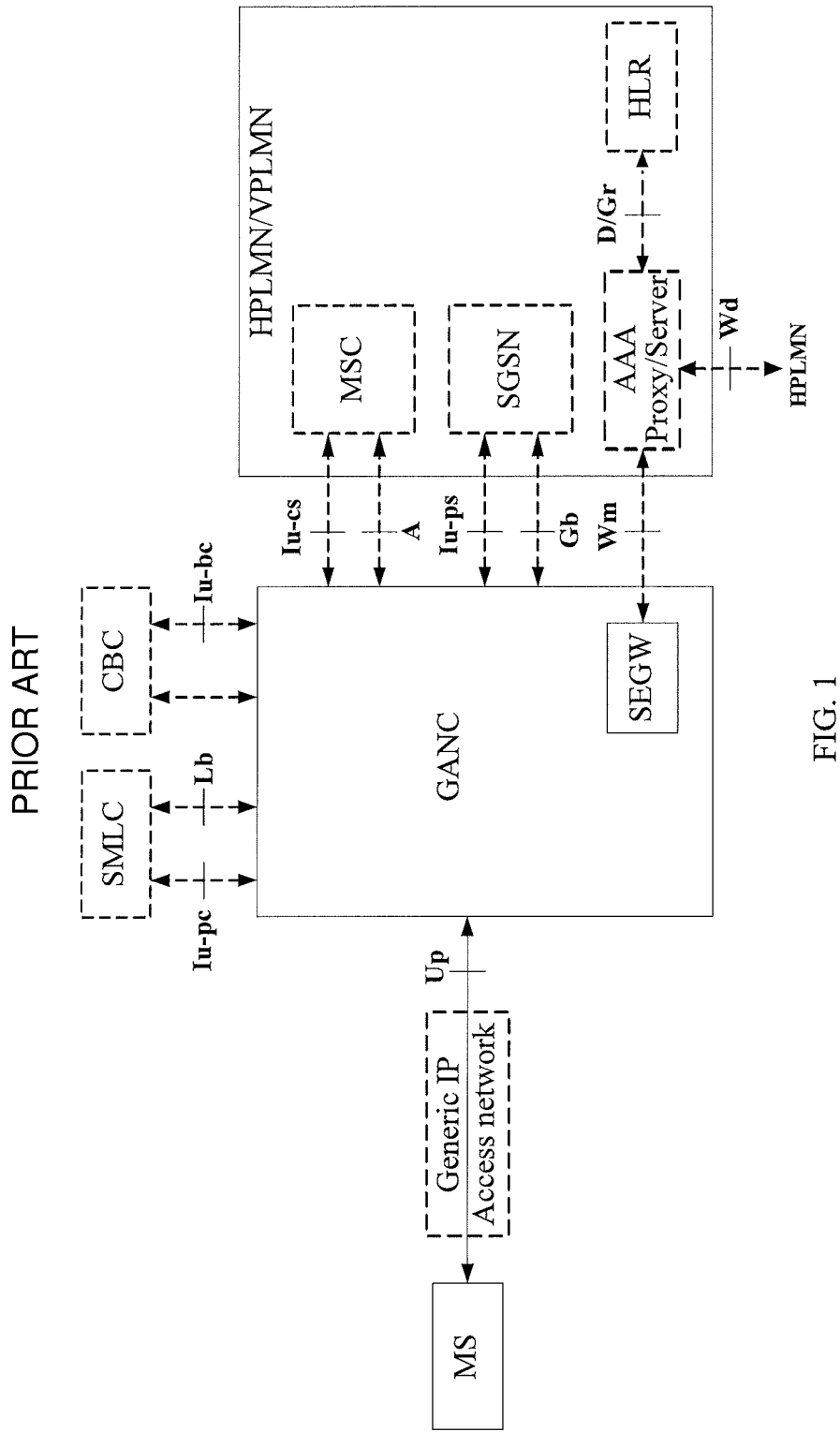
FIG. 1 is a GAN/EGAN architecture diagram in the prior art.
Figure 2:
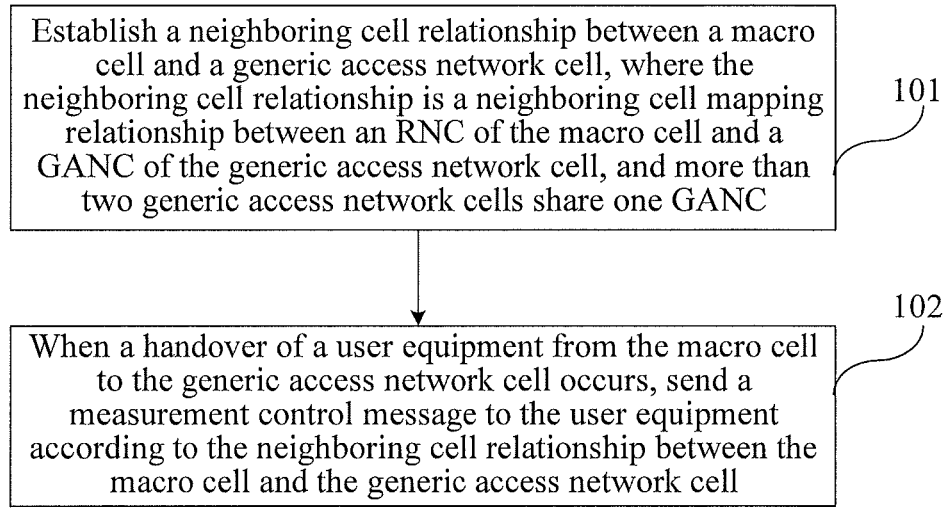
FIG. 2 is a schematic flow chart of a method for processing GAN neighboring network configuration according to an embodiment of the present invention.

An embodiment of the present invention provides a method for processing GAN neighboring network configuration. FIG. 2 is a schematic flow chart of a method for processing GAN neighboring network configuration according to an embodiment of the present invention.

101: Establish a neighboring cell relationship between a macro cell and a generic access network cell.

For example, a macro network may be a network such as a UMTS or LTE network, and in this step, a radio network controller establishes the neighboring cell relationship between the macro cell and the generic access network cell. The neighboring cell relationship is a neighboring cell mapping relationship between an RNC of the macro cell and a GANC of the generic access network cell. Specifically, the above mapping relationship may be established according to a scrambling code, a frequency number, a network color code, a base station color code, and the like of the GANC. More than two generic access network cells share one GANC, and the macro cell may be a UMTS cell, an LTE cell, and the like. When the neighboring cell relationship between the macro cell and the generic access network cell is established, for example, the neighboring cell mapping relationship between the RNC and the GANC may be established, and generally, multiple GAN cells (for example, at least two or at least three cells) share one GANC.

102: When a handover of a user equipment from the macro cell to the generic access network cell occurs, send a measurement control message to the user equipment according to the neighboring cell relationship between the macro cell and the generic access network cell.

For example, when a handover of a user equipment from the macro cell to the generic access network cell occurs, the radio network controller sends a measurement control message to the user equipment according to the neighboring cell relationship between the macro cell and the generic access network cell, for example, a handover of the user equipment between the macro cell and the generic access network cell is performed according to the neighboring cell relationship.

In the method for processing neighboring network configuration in a generic access network according to the above embodiment of the present invention, when a neighboring cell relationship between each macro cell and a generic access network cell is established, the neighboring cell relationship with an RNC of the macro cell is established based on a unit of a GANC; because multiple generic access network cells share one GANC in an actual generic access network, compared with the establishment of a neighboring cell relationship with the RNC of the macro cell that is performed based on a unit of the generic access network cell, when the neighboring cell relationship with the RNC is established based on a unit of the GANC in this embodiment, the number of the mapping relationships is decreased, the complexity of performing neighboring network configuration between a GAN network and a network such as a UMTS or LTE network may be effectively reduced, and the workload of network management and configuration is lowered.

In a generic access network technology, the GANC may be classified into an Iu mode and an A/Gb mode according to the difference of hardware interfaces. In Iu mode, the measurement control message sent by the GANC to the user equipment is an intra-frequency measurement control message, and in A/Gb mode, the measurement control message sent by the GANC to the user equipment is a 3A measurement control message. In this embodiment, when the neighboring GANC configuration of the macro cell is further implemented, it may be further set that the relationship between the RNC and the GANC is in two types of modes: a blind compensation mode or an offload mode. The blind compensation mode may be set in a GANC in a weak signal coverage area of a UMTS network, and plays a role of supplementing a UMTS cell; the offload mode may be set in a home GANC, where a coverage area of the GANC may not be a weak signal coverage area of a UMTS network but the access of the user equipment may lead to a low tariff; and a handover of the user equipment from the macro cell to the GAN cell may occur in both of the two areas. To sum up, the neighboring GANC of the macro cell may be set to be in "A/Gb blind compensation mode", an "A/Gb offload mode", "Iu blind compensation mode", and "Iu offload mode".

In addition, in a specific embodiment of the present invention, when a measurement control message is delivered to the user equipment, the measurement control message is sent to the user equipment only when a best macro cell (for example, a macro cell with the best signal quality) in an active set of the user equipment has a neighboring cell, and the neighboring cell of the best macro cell is measured, that is, in the above embodiment, the sending a measurement control message according to the neighboring cell relationship between the macro cell and the generic access network cell specifically includes: when it is determined, according to the neighboring cell relationship between each macro cell and the generic access network cell, that the current best macro cell is configured with a neighboring GANC, sending a measurement control message to the user equipment, where the measurement control message is used to instruct the user equipment to measure the neighboring GANC of the best macro cell.

In a specific embodiment, when it is determined that the current best macro cell is not configured with a neighboring GANC, no preprocessing related to the sending of a measurement control message is performed; and if a measurement control message is already delivered, the measurement control message is released; and when it is determined that the current best macro cell is configured with a neighboring GANC, processing is performed according to the difference of the type of the neighboring GANC; and specifically, the following content is included.

For example, when the best macro cell is configured with a neighboring GANC in blind compensation mode, the receiving of a poor signal event of the current macro cell reported by the user equipment is waited, and only when the poor signal event of the current macro cell reported by the user equipment is received, it is further determined whether to send a measurement control message to the user equipment according to one or a combination of the following items: a handover capability of the user equipment, a current service type of the user equipment, a service type supported by a target generic access network cell, a radio network controller of a source macro cell, and a handover capability of a core network of the radio network controller of the macro cell. The poor signal event of the current macro cell may be a 2D event specified according to a 3GPP TS25.331 protocol, that is, the user equipment detects the quality of a received signal in real time, and when the quality of the received signal is lower than a threshold, a signal indicating that the signal is poor is returned to the radio network controller. For example, in a situation in which the user equipment has the capability of handing over from the macro cell to the generic access network cell, the target generic access network cell supports the type of the service currently carried out by the user equipment, and the radio network controller of the source macro cell and the core network of the radio network controller of the macro cell support the handover of the user equipment from the macro cell to the generic access network cell, it is determined to generate a measurement control message, and the measurement control message is sent to the user equipment, so as to measure the neighboring GANC of the best macro cell. For example, when the neighboring GANC is in A/Gb blind compensation mode, the sent measurement control message is a 3A measurement control message; and when the neighboring GANC is in Iu blind compensation mode, the sent measurement control message is an intra-frequency measurement control message. In the embodiment of the present invention, the reporting of the 2D event, the sending of the 3A measurement control message and the like can be carried out according to a regulation of the 3GPP TS25.331 protocol, where the reporting, by the user equipment, the 2D event indicates that the user equipment is currently in a poor signal environment and requires a network handover, and the GAN network in blind compensation mode is applicable to some environments in which the coverage of the UMTS network is poor.

For example, when the best macro cell is configured with a neighboring GANC in offload mode, the reporting of the 2D event is not waited, but it is directly determined whether to send a measurement control message to the user equipment according to one or a combination of the following items: the handover capability of the user equipment, the current service type of the user equipment, the service type supported by the target generic access network cell, the radio network controller of the source macro cell, and the handover capability of the core network of the radio network controller of the macro cell. For example, in a situation in which the user equipment has the capability of handing over from the macro cell to the generic access network cell, the target generic access network cell supports the type of the service currently carried out by the user equipment, and the radio network controller of the source macro cell and the core network of the radio network controller of the macro cell support the handover of the user equipment from the macro cell to the generic access network cell, it is determined to generate a measurement control message and the measurement control message is sent to the user equipment. For example, when the neighboring GANC is in A/Gb offload mode, the sent measurement control message is a 3A measurement control message; and when the neighboring GANC is in Iu offload mode, the sent measurement control message is an intra-frequency measurement control message. In this embodiment, the offload mode may be applied in a situation in which a GAN network is deployed at home or in an office area. When the user equipment enters a GAN network area from a UMTS cell, the strength of a signal in the UMTS cell may still be strong, but the user intends to use the GAN network in the area; therefore, when a neighboring GANC in offload mode exists in the current best macro cell in the active set, the reporting of a 2D event may not be waited and a measurement control message is directly sent to the user equipment, so as to notify the user equipment to implement the measurement on the GAN network. The introduction of the offload mode may enrich application scenarios of the GAN network.

Compared with a technical solution in which only neighboring cells of all macro cells in the active set are measured and controlled in the handover process, in the embodiment of the present invention, when delivering the measurement control message in the handover process, the RNC in the UMTS network only instructs the user equipment to measure the neighboring cell of the best macro cell in the active set; therefore, the influence of the GAN cell on the current handover performance may be effectively reduced in an interworking process of the UMTS and the GAN network.

In addition, in the above embodiment of the present invention, after it is determined, according to multiple conditions, that a measurement control message may be sent to the user equipment, it may be further determined whether a same measurement control message in a validity period exists, where the validity period of the measurement control message in this embodiment refers to whether a best macro cell in the active set is changed. Specifically, with respect to the technical solution of the present invention, the best macro cell in the active set of the user equipment is allowed handing over to a neighboring cell of the best macro cell, and the measurement control message also instructs the user equipment to perform measurement on the neighboring cell of the best macro cell; therefore, if the best macro cell is not changed, the content of the measurement control message sent to the user equipment is the same, and it is unnecessary to send the measurement control message; in this embodiment, the above determination may avoid the repeated delivery of the measurement control message.

Figure 3:
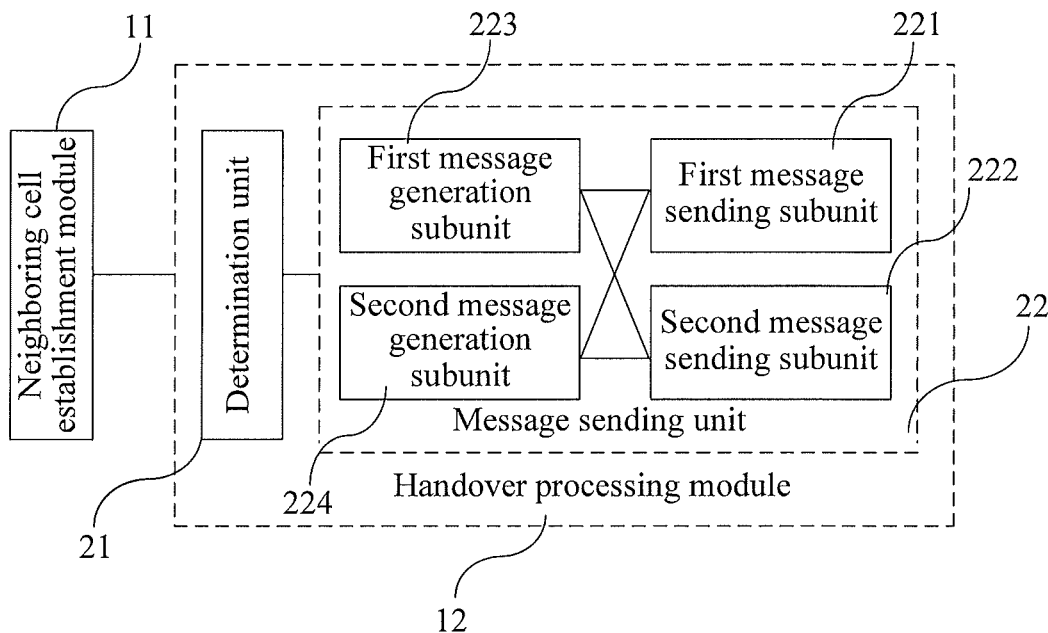
FIG. 3 is a schematic structural diagram of an apparatus for processing GAN neighboring network configuration according to another embodiment of the present invention.

Corresponding to the above method embodiment, an embodiment of the present invention further provides an apparatus for processing network configuration, where the apparatus may be configured in a radio network controller in a macro cell. FIG. 3 is a schematic structural diagram of an apparatus for processing GAN neighboring network configuration according to another embodiment of the present invention. As shown in FIG. 3, the apparatus includes a neighboring cell establishment module 11 and a handover processing module 12. The neighboring cell establishment module 11 is configured to establish a neighboring cell relationship between a macro cell and a generic access network cell, where the neighboring cell relationship is a neighboring cell mapping relationship between a radio network controller of the macro cell and a generic access network controller of the generic access network cell, and more than two generic access network cells share one generic access network controller. The handover processing module 12 is configured to: when a handover of a user equipment from the macro cell to the generic access network cell occurs, send a measurement control message to the user equipment according to the neighboring cell relationship between the macro cell and the generic access network cell.

In the apparatus for processing neighboring network configuration in a generic access network according to the above embodiment of the present invention, when a neighboring cell relationship between each macro cell and a generic access network cell is established, the neighboring cell relationship with an RNC of the macro cell is established based on a unit of a GANC; because multiple generic access network cells share one GANC in an actual generic access network, compared with the establishment of a neighboring cell relationship with the RNC of the macro cell that is performed based on a unit of the generic access network cell, when the neighboring cell relationship with the RNC is established based on a unit of the GANC in this embodiment, the number of the mapping relationships is decreased, the complexity of performing neighboring network configuration between a GAN network and a network such as a UMTS or LTE network may be effectively reduced, and the workload of network management and configuration is lowered.

The handover processing module 12 in the above embodiment of the present invention may specifically include a determination unit 21 and a message sending unit 22, where the determination unit 21 is configured to determine, according to the neighboring cell relationship between the macro cell and the generic access network cell, whether a current best macro cell is configured with a neighboring generic access network controller; and the message sending unit 22 is configured to: when it is determined that the current best macro cell is configured with the neighboring generic access network controller, send a measurement control message to the user equipment, where the measurement control message is used to instruct the user equipment to measure the neighboring generic access network controller of the best macro cell.

In the prior art, a measurement control message is delivered for neighboring cells of all macro cells in an active set; while in this embodiment, a measurement control message is delivered for a neighboring cell of the best macro cell in the active set; therefore, the influence of the GAN cell on the current handover performance may be effectively reduced in an interworking process of the UMTS and the GAN network.

Specifically, due to the difference of types of the neighboring generic access network controllers of the best macro cell, different types of measurement control messages may be sent to the user equipment, that is, the message sending unit 22 may include a first message sending subunit 221 or a second message sending subunit 222. The first message sending subunit 221 is configured to: when the neighboring generic access network controller of the best macro cell is in Iu mode, send an intra-frequency measurement control message to the user equipment, where the measurement control message is used to instruct the user equipment to measure the neighboring generic access network controller of the best macro cell. The second message sending subunit 222 is configured to: when the neighboring generic access network controller of the best macro cell is in A/Gb mode, send a 3A measurement control message to the user equipment, where the measurement control message is used to instruct the user equipment to measure the neighboring generic access network controller of the best macro cell.

In addition, in a specific embodiment of the present invention, the types of the neighboring GANCs may be classified into an offload mode and a blind compensation mode. The blind compensation mode may be set in a GANC in a weak signal coverage area of a UMTS network and plays a role of supplementing a UMTS cell; the measurement and control on the GAN cell is triggered when it is detected that a signal is weak. The offload mode may be applied in a situation that a GAN network is deployed at home or in an office area. When the user equipment enters a GAN network area from a UMTS cell, the strength of a signal in the UMTS cell may still be strong, but the user intends to use the GAN network in the area to achieve effects of reducing the tariff and the like. For the above two situations, the apparatus for processing neighboring network configuration in a generic access network may further include a first message generation subunit 223 or a second message generation subunit 224, and a third message sending subunit. For example, the first message generation subunit 223 is configured to determine to generate a measurement control message according to one or a combination of the following items: a handover capability of the user equipment, a current service type of the user equipment, a service type supported by a target generic access network cell, a radio network controller of a source macro cell, and a handover capability of a core network of the radio network controller of the macro cell, when a relationship between the source macro cell in which a handover occurs and the generic access network controller of the target generic access network cell is in blind compensation mode and after a poor signal event (for example, a 2D event specified in a 3GPP TS25.331 protocol) of the current macro cell is received. The second message generation subunit 224 is configured to determine to generate a measurement control message directly according to one or a combination of the following items: the handover capability of the user equipment, the current service type of the user equipment, the service type supported by the target generic access network cell, the radio network controller of the source macro cell, and the handover capability of the core network of the radio network controller of the macro cell, when the relationship between the source macro cell in which the handover occurs and the generic access network controller of the target generic access network cell is in offload mode. The third message sending subunit is configured to send the measurement control message to the user equipment.

An embodiment of the present invention further provides a radio network controller of a macro network, where the radio network controller includes the apparatus for processing network configuration in the above embodiment.

In the method and apparatus for processing network configuration, and the radio network controller that are provided in the above embodiments of the present invention, when neighboring cell configuration is performed between a macro cell and a GAN cell, a neighboring cell relationship between the macro cell and the GAN cell is established based on a unit of the GANC; compared with the prior art, the complexity of performing neighboring network configuration between a GAN network and a network such as a UMTS or LTE network may be effectively reduced, and the workload of network management and configuration is lowered. In addition, for a handover of the user equipment from a macro cell to a generic access network cell, a measurement control message is delivered only for a neighboring GANC of the best macro cell in an active set; therefore, the influence of the GAN cell on the current handover performance may be effectively reduced in an interworking process of the UMTS and the GAN network. The introduction of the offload mode enriches service application scenarios, which makes the deployment of the GAN network more flexible.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium capable of storing program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications can still be made to the technical solutions described in the foregoing embodiments or equivalent replacements can still be made to some technical features thereof, without departing from scope of the technical solutions of the embodiments of the present invention.

What is claimed is:

1. A method for processing network configuration, comprising:
   establishing, by a radio network controller (RNC), a neighboring cell relationship between at least two macro cells and at least two generic access network cells,
   wherein:
      the neighboring cell relationship is a neighboring cell mapping relationship between the RNC of the least two macro cells and at least one generic access network controller (GANC) of the least two generic access network cells, and
      at least two generic access network cells among the at least two generic access network cells share one GANC among the at least one GANC; and
   sending, by the RNC, a measurement control message to a user equipment (UE) according to the neighboring cell relationship in response to the UE handing over from a macro cell among the at least two macro cells to a generic access network cell among the at least two generic access network cells;
   wherein the neighboring cell mapping relationship is set in one of a blind compensation mode and an offload mode;
   wherein the blind compensation mode is that the GANC is in a weak signal coverage area of a UMTS network, and the blind compensation mode is set in the GANC for supplementing a UMTS cell, in response to the UE handing over from the macro cell to the generic access network cell in the weak signal coverage area;
   wherein the offload mode is that the GANC is a home GANC, and the offload mode is set in the home GANC in which a coverage area of the home GANC is not a weak signal coverage area of a UMTS network but an access of the UE leads to a lower tariff, in response to the UE handing over from the macro cell to the generic access network cell in the coverage area of the home GANC.

2. The method for processing network configuration according to claim 1, wherein the sending the measurement control message according to the neighboring cell relationship comprises:
   determining, according to the neighboring cell relationship, that a current best macro cell, which has a best signal quality among the at least two macro cells, is configured with a neighboring GANC,
   sending the measurement control message to the UE,
   wherein the measurement control message is used to instruct the UE to measure signal quality of cells of the neighboring GANC of the current best macro cell.

3. The method for processing network configuration according to claim 1, wherein if a relationship between a source macro cell in which a handover occurs and a GANC of a target generic access network cell is in blind compensation mode, the method further comprises:
   receiving a reported poor signal event of a current macro cell;
   after receiving the reported poor signal event of the current macro cell, generating the measurement control message according to one or a combination of the following items: a handover capability of the UE, a current service type of the UE, a service type supported by the target generic access network cell, a RNC of a source macro cell, and a handover capability of a core network (CN) of the RNC of the source macro cell; and
   sending the measurement control message to the UE.

4. The method for processing network configuration according to claim 1, wherein if a relationship between a source macro cell in which a handover occurs and a GANC of a target generic access network cell is in offload mode, the method further comprises:
   generating the measurement control message according to one or a combination of the following items: a handover capability of the UE, a current service type of the UE, a service type supported by the target generic access network cell, a RNC of the source macro cell, and a handover capability of a core network (CN) of the RNC of the source macro cell; and
   sending the measurement control message to the user equipment.

5. An apparatus for processing network configuration, comprising:
   a processor, configured to establish as a radio network controller (RNC) a neighboring cell relationship between at least two macro cells and at least two generic access network cells, wherein:
      the neighboring cell relationship is a neighboring cell mapping relationship between the RNC of the least two macro cells and at least one generic access network controller (GANC) of the least two generic access network cells, and
      at least two generic access network cells among the at least two generic access network cells share one GANC among the at least one GANC; and
   a transmitter, configured to send a measurement control message to a user equipment (UE) according to the neighboring cell relationship in response to the UE handing over from a macro cell among the at least two macro cells to a generic access network cell among the at least two generic access network cells;

wherein the neighboring cell mapping relationship is set in one of a blind compensation mode and an offload mode;

wherein the blind compensation mode is that the GANC is in a weak signal coverage area of a UMTS network, and the blind compensation mode is set in the GANC for supplementing a UMTS cell, in response to the UE handing over from the macro cell to the generic access network cell in the weak signal coverage area;

wherein the offload mode is that the GANC is a home GANC, and the offload mode is set in the home GANC in which a coverage area of the home GANC is not a weak signal coverage area of a UMTS network but an access of the UE leads to a lower tariff, in response to the UE handing over from the macro cell to the generic access network cell in the coverage area of the home GANC.

6. The apparatus for processing network configuration according to claim 5, wherein, the processor is further configured to determine, according to the neighboring cell relationship, whether a current best macro cell, which has a best signal quality among the at least two macro cells, is configured with a neighboring GANC; and the transmitter is further configured to: when determined that the current best macro cell is configured with the neighboring GANC, send the measurement control message to the UE, wherein the measurement control message is used to instruct the UE to measure signal quality of cells of the neighboring GANC of the current best macro cell.

7. The apparatus for processing network configuration according to claim 5, wherein, the processor is further configured to generate the measurement control message according to one or a combination of the following items: a handover capability of the UE, a current service type of the UE, a service type supported by a target generic access network cell, a RNC of a source macro cell, and a handover capability of a core network (CN) of the RNC of the source macro cell, when a relationship between the source macro cell in which a handover occurs and a GANC of the target generic access network cell is in blind compensation mode and after a reported poor signal event of the current macro cell is received; and the transmitter is further configured to send the measurement control message to the UE.

8. The apparatus for processing network configuration according to claim 5, wherein, the processor is further configured to generate a measurement control message according to one or a combination of the following items: a handover capability of the UE, a current service type of the UE, a service type supported by the target generic access network cell, a RNC of the source macro cell, and a handover capability of a core network (CN) of the RNC of the source macro cell, when a relationship between a source macro cell in which a handover occurs and a GANC of a target generic access network cell is in offload mode; and the transmitter is further configured to send the measurement control message to the UE.

9. A non-transitory machine-readable medium having stored thereon, a computer program comprising at least one code section for distributing data, the at least one code section being executable by a radio network controller (RNC) machine for causing the RNC machine to perform:

establishing a neighboring cell relationship between at least two macro cells and at least two generic access network cells, wherein:

the neighboring cell relationship is a neighboring cell mapping relationship between the RNC of the least two macro cells and at least one generic access network controller (GANC) of the least two generic access network cells, and at least two generic access network cells among the at least two generic access network cells share one GANC among the at least one GANC; and sending a measurement control message to a user equipment (UE) according to the neighboring cell relationship in response to the UE handing over from a macro cell among the at least two macro cells to a generic access network cell among the at least two generic access network cells;

wherein the neighboring cell mapping relationship is set in one of a blind compensation mode and an offload mode;

wherein the blind compensation mode is that the GANC is in a weak signal coverage area of a UMTS network, and the blind compensation mode is set in the GANC for supplementing a UMTS cell, in response to the UE handing over from the macro cell to the generic access network cell in the weak signal coverage area;

wherein the offload mode is that the GANC is a home GANC, and the offload mode is set in the home GANC in which a coverage area of the home GANC is not a weak signal coverage area of a UMTS network but an access of the UE leads to a lower tariff, in response to the UE handing over from the macro cell to the generic access network cell in the coverage area of the home GANC.

10. The non-transitory machine-readable medium according to claim 9, wherein the RNC further performs:

determining, according to the neighboring cell relationship, that a current best macro cell, which has a best signal quality among the at least two macro cells, is configured with a neighboring GANC, sending the measurement control message to the UE, wherein the measurement control message is used to instruct the UE to measure signal quality of cells of the neighboring GANC of the current best macro cell.

11. The non-transitory machine-readable medium according to claim 9, wherein if a relationship between a source macro cell in which a handover occurs and a GANC of a target generic access network cell is in blind compensation mode, the RNC further performs:

receiving a reported poor signal event of a current macro cell;

after receiving the reported poor signal event of the current macro cell, generating the measurement control message according to one or a combination of the following items: a handover capability of the UE, a current service type of the UE, a service type supported by the target generic access network cell, a RNC of a source macro cell, and a handover capability of a core network (CN) of the RNC of the source macro cell; and sending the measurement control message to the UE.

12. The non-transitory machine-readable medium according to claim 9, wherein if a relationship between a source macro cell in which a handover occurs and a GANC of a target generic access network cell is in offload mode, the RNC further performs:

generating the measurement control message according to one or a combination of the following items: a handover capability of the UE, a current service type of the UE, a service type supported by the target generic access network cell, a RNC of the source macro cell, and a handover capability of a core network (CN) of the RNC of the current macro cell; and sending the measurement control message to the UE.

* * * * *